United States Patent [19]
Leonard

[11] Patent Number: 5,708,866
[45] Date of Patent: Jan. 13, 1998

[54] CAMERA SELECTS UNUSED FLASH BULB FARTHEST FROM TAKING LENS TO REDUCE RED-EYE EFFECT WHEN CAMERA-TO-SUBJECT DISTANCE WITHIN NEAR RANGE

[75] Inventor: Bruce Adams Leonard, Honeoye Falls, N.Y.

[73] Assignee: Eastman Kodak Company, Rochester, N.Y.

[21] Appl. No.: 642,139

[22] Filed: May 2, 1996

[51] Int. Cl.⁶ .................................................. G03B 15/03
[52] U.S. Cl. .......................... 396/62; 396/175; 396/89; 362/13; 431/359
[58] Field of Search .................... 354/126, 127.1, 354/132, 143, 149.1; 362/3, 4, 11, 13; 431/357, 359; 396/89, 106, 109, 155, 157, 158, 175, 61, 62

[56] References Cited

U.S. PATENT DOCUMENTS 3,937,946  2/1976  Weber ............................................ 362/4
4,051,359  9/1977  Steicher ......................................... 362/4

*Primary Examiner*—Safet Metjahic
*Assistant Examiner*—J. K. Han
*Attorney, Agent, or Firm*—Roger A. Fields

[57] ABSTRACT

A camera intended to be used with a multiple flash bulb unit selects an unused flash bulb farthest from the taking lens to reduce a red-eye effect when a near range camera-to-subject distance is chosen and selects an unused flash bulb closest to the taking lens when a far range camera-to-subject distance is selected.

5 Claims, 4 Drawing Sheets

CAMERA SELECTS UNUSED FLASH BULB FARTHEST FROM TAKING LENS TO REDUCE RED-EYE EFFECT WHEN CAMERA-TO-SUBJECT DISTANCE WITHIN NEAR RANGE

FIELD OF THE INVENTION

The invention relates generally to the field of photography, and in particular to a camera for use with a multiple flash bulb unit. More specifically, the invention relates to a camera that selects the unused flash bulb farthest from the taking lens to minimize red-eye effect when the camera-to-subject distance is within a near range.

BACKGROUND OF THE INVENTION

It is well known for cameras to be used with a multiple flash bulb unit. The desire to make cameras relatively small, however, has tended to reduce the separation between the flash bulbs and the camera's taking lens to a few inches. Consequently, there is a tendency for an undesirable effect commonly known as "red-eye" to occur.

When using color print film and a multiple flash bulb unit, red-eye is typified by the pupils in the eyes of a person being photographed coming out red-tinted on a color print made from the exposed film. This occurs when the flash illumination enters the pupils in ones eyes, and illuminates the retinas in ones eyes at regions approximately in line with the camera's taking lens. The illuminated red coloring of the retinas causes the pupils to appear red-tinted, and is reflected into the taking lens.

Red-eye may be substantially avoided by increasing the separation between the flash unit and the camera's taking lens. As a result, the light emitted from the flash unit will reach the eyes of a person being photographed at too great an angle to be reflected by the retinas into the taking lens.

One actual solution to the problem is to use a multiple flash bulb unit commonly known as a "flip-flash" unit. An example of a flip-flash unit is disclosed in U.S. Pat. No. 3,937,946, issued Feb. 10, 1976. The flip-flash unit is evenly divided into two similar-number groups of flash lamps, one group being vertically located above the other group when the flip-flash unit is connected to a flash socket on the camera. Only the group farthest from the taking lens of the camera is used. When each of the flash bulbs in that group have been ignited, the flap-flash unit is disconnected from the flash socket, inverted, and then re-connected to the flash socket. Thus, the unused bulbs are always farthest from the taking lens.

While the flip-flash unit has gained wide acceptance, it requires the photographer to remember to invert the flip-flash unit when each of the flash bulbs in the group farthest from the camera's taking lens have been ignited. A failure to do this can result in underexposed pictures.

SUMMARY OF THE INVENTION

Generally speaking, there is provided a camera intended to be used with a multiple flash bulb unit, comprising:

a taking lens; and means for selecting an unused flash bulb farthest from the taking lens to reduce a red-eye effect when the camera-to-subject distance does not exceed a predetermined distance.

More specifically, there is provided a camera intended to be used with a multiple flash bulb unit, comprising:

a taking lens;

means for selecting a relatively near range camera-to-subject distance and for selecting a relatively far range camera-to-subject distance; and means for selecting an unused flash bulb farthest from the taking lens to reduce a red-eye effect when the near range camera-to-subject distance is selected and for selecting an unused flash bulb closest to the taking lens when the far range camera-to-subject distance is selected.

BRIEF DESCRIPTION THE DRAWINGS

DETAILED DESCRIPTION OF THE INVENTION

The invention is disclosed as being embodied preferably in a camera for use with a multiple flash bulb unit. Because the features of a camera for use with a multiple flash bulb unit are generally known, the description which follows is directed in particular only to those elements forming part of or cooperating directly with the disclosed embodiment. It is to be understood, however, that other elements may take various forms known to a person of ordinary skill in the art.

Figure 1:
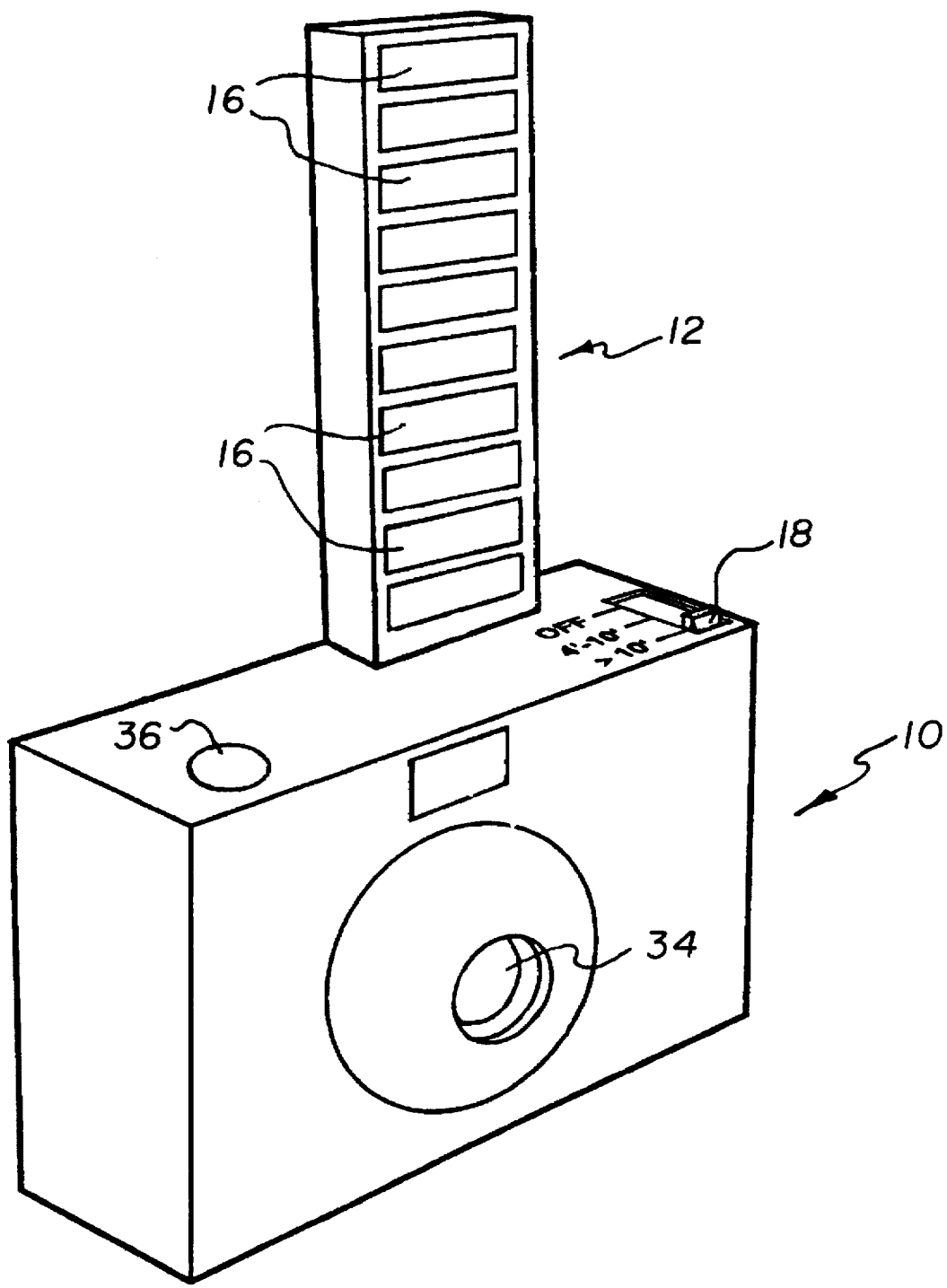
FIG. 1 is a front perspective view of a camera for use with a multiple flash bulb unit according to a preferred embodiment of the invention.
Figure 2:
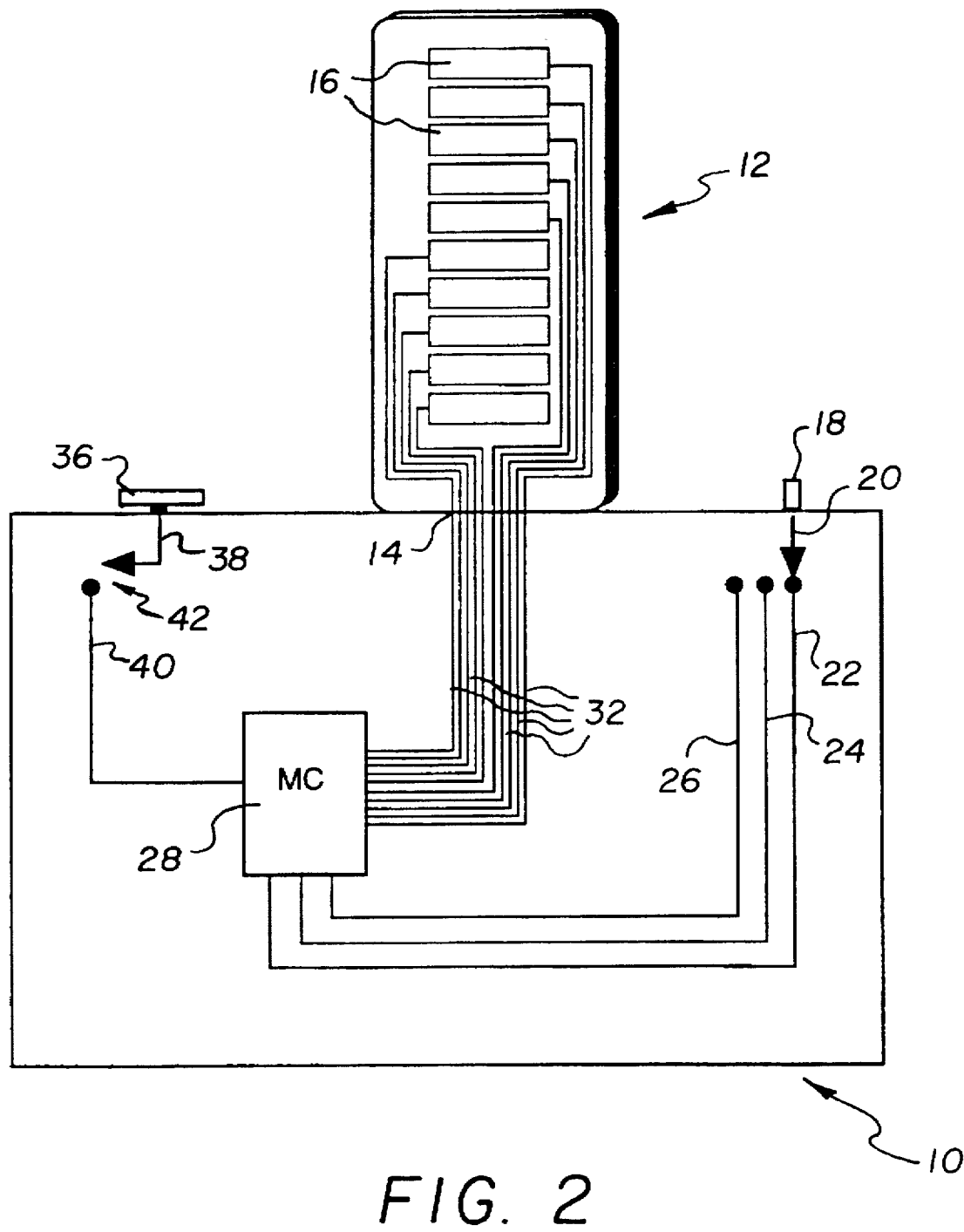
FIG. 2 is a schematic view of means in the camera for selecting an unused flash bulb farthest from the camera's taking lens to minimize red-eye effect when a near range camera-to-subject distance is selected and for selecting an unused flash bulb closest to the taking lens when a far range camera-to-subject distance is selected.

Referring now to the drawings, FIGS. 1 and 2 show a camera 10 and a multiple flash bulb unit 12 which is connected to the camera via a socket 14 on the camera. The multiple flash bulb unit 12 has ten vertically stacked, electrically ignitable, known type flash bulbs 16.

As shown in FIG. 1, the camera 10 has a manual selector tab 18 which is slideable to any one of three discrete settings. The first setting "OFF" is selected when a daylight (rather than a flash) exposure is desired. The second setting "4'–10'" is selected when a flash exposure is desired and the camera-to-subject distance is within a near range, i.e. 4 feet to 10 feet. The third setting ">10'" is selected when a flash exposure is desired and the camera-to-subject distance is within a far range, i.e. greater than 10 feet (10 feet to infinity).

As shown in FIG. 2, the selector tab 18 has an indicator lead 20 that is moved into individual contact with respective input leads 22, 24 and 26 of a known type microcomputer 28 in accordance with whether the selector tab is moved to its "OFF" setting, to its "4'–10'" setting, or to its ">10'" setting. The indicator lead 20 and the three input leads 22, 24 and 26 in essence constitute a known three-state selector switch 30 which has three alternative closed states equivalent to the "OFF", "4'–10'" and ">10'" settings of the selector tab 18.

The microcomputer 28 has respective input/output leads 32 coupled to the ten flash bulbs 16. The input/output leads 32 enable the microcomputer 28 to determine which one of the flash bulbs 16 is not yet used and is either farthest from or closest to a taking lens 34 of the camera 10.

A known manually depressible shutter release button 36 of the camera 10 has an indicator lead 38 that is moved into contact with an input lead 40 of the microcomputer 28 when the shutter release button is manually depressed to initiate daylight or flash picture-taking. The indicator lead 38 and the input lead 40 in essence constitute a known two-state normally open shutter release switch 42 which is changed from an open state to a closed state when the indicator lead is moved into contact with the input lead responsive to depression of the shutter release button 36.

Operation

Figure 3:
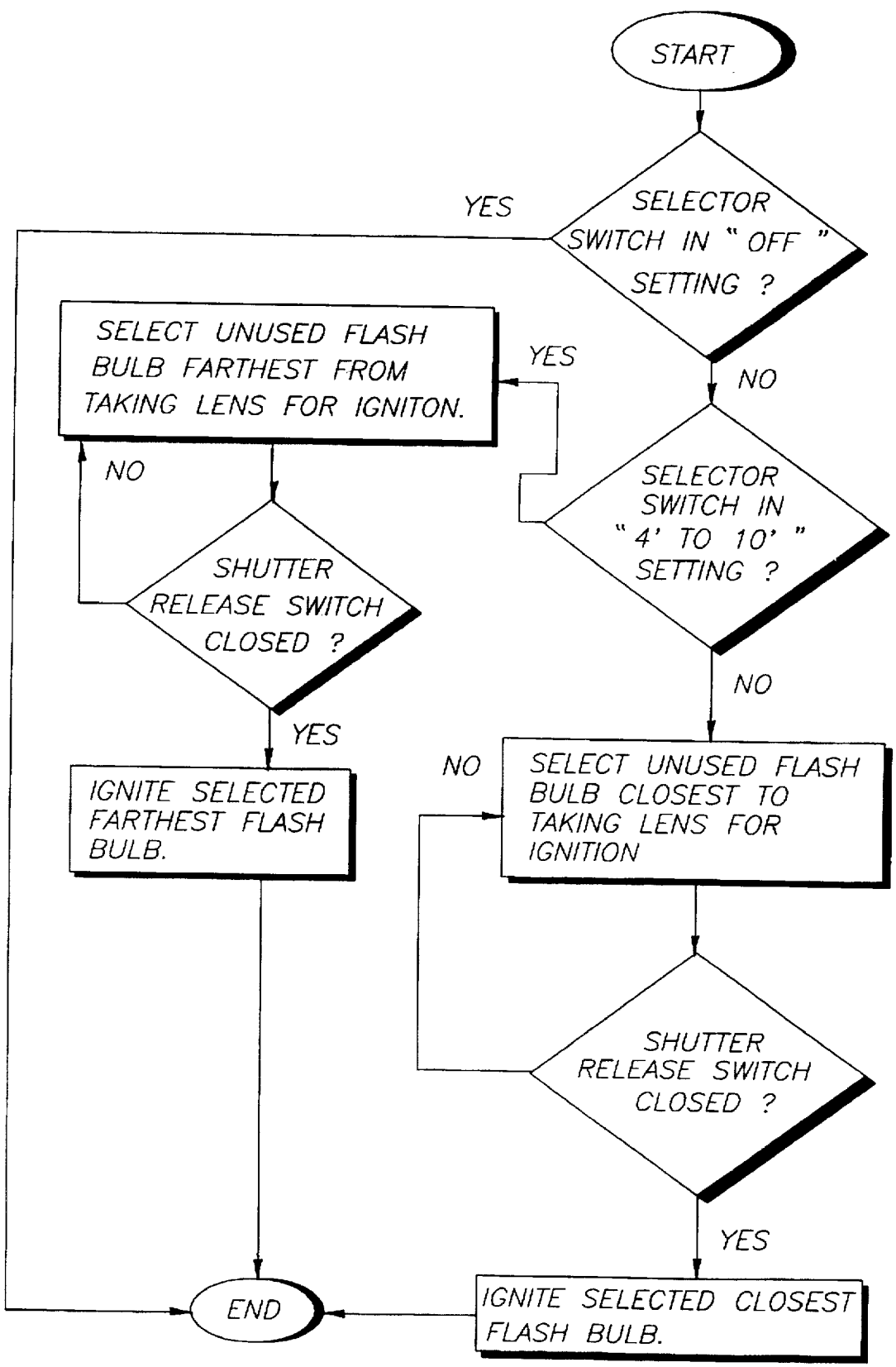
FIG. 3 is a flow chart depicting operation the means shown in FIG. 2.
Figure 4:
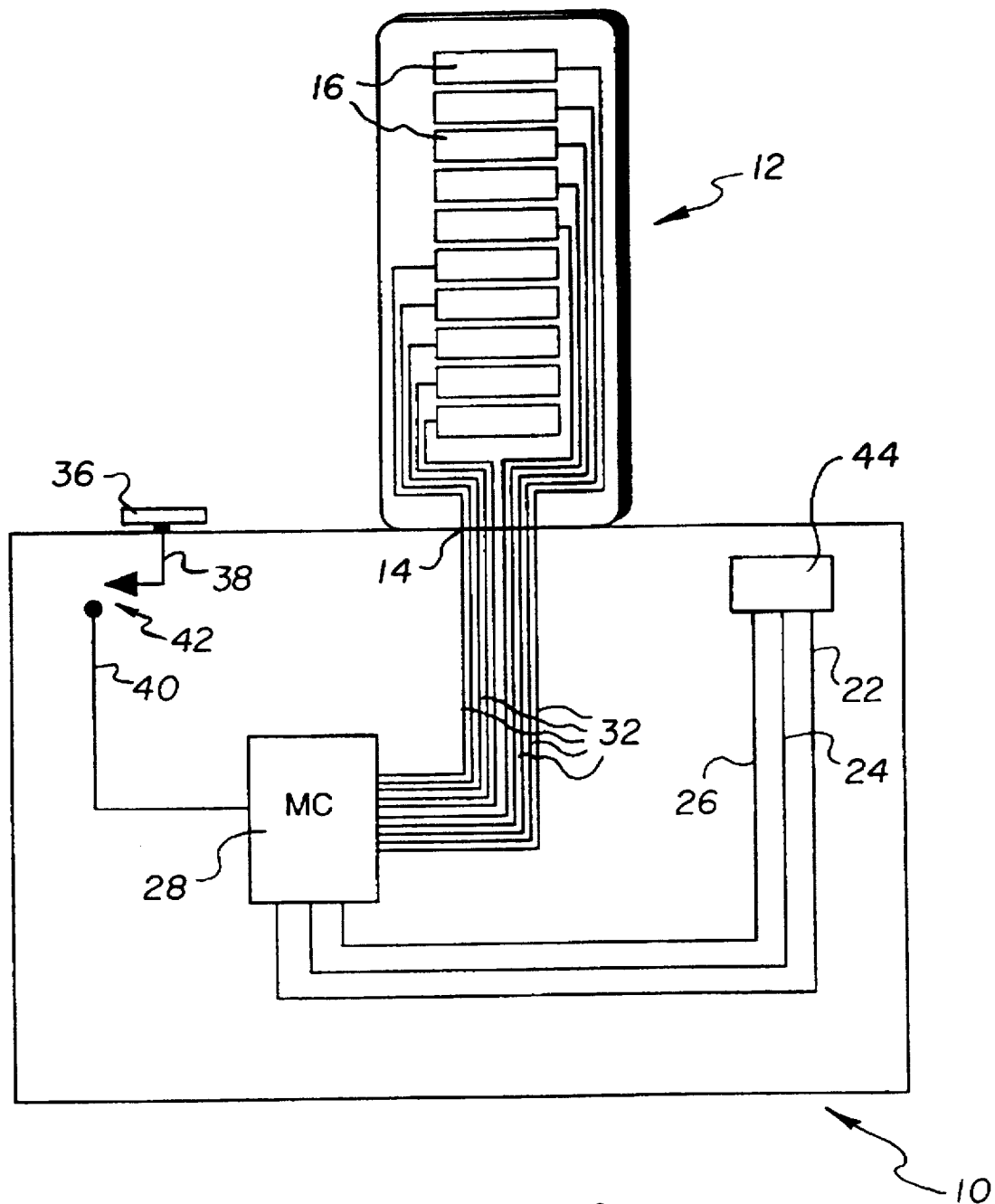
FIG. 4 is a schematic view somewhat similar to FIG. 2, but a modified embodiment of the invention.

As indicated in FIG. 3, the microcomputer 28 determines whether the three-state selector switch 30 is in the "OFF" setting, the "4'–10'" setting, or the ">10'" setting for the selector tab 18.

If the selector switch 30 is in the "OFF" setting for the selector tab 18, the microcomputer 28 does not trigger ignition of anyone of the flash bulbs 16 when the two-state shutter release switch 42 is changed from the open state to the closed state.

If the selector switch 30 is in the "4'–10'" setting for the selector tab 18, the microcomputer 28 determines which one of the flash bulbs 16 is not yet used and is farthest from the taking lens 34. Then, when the two-state shutter release switch 42 is changed from the open state to the closed state, the microcomputer 28 triggers ignition of the selected farthest one of the unused bulbs.

If the selector switch 30 is in the ">10'" setting for the selector tab 18, the microcomputer 28 determines which one of the flash bulbs 16 is not yet used and is closest to the taking lens 34. Then, when the two-state shutter release switch 42 is changed from the open state to the closed state, the microcomputer 28 triggers ignition of the selected closest one of the unused bulbs.

The invention has been described with reference to a preferred embodiment. However, it will be appreciated that variations and modifications can be effected by a person of ordinary skill in the art without departing from the scope of the invention. For example, instead of the manual selector tab 18 being used to select either the "4'–10'" setting or the ">10'" setting, comparable or narrower settings could be automatically selected via a known multi-zone automatic focus/rangefinder device 44 coupled to the microcomputer 28. Alternatively, a manual focus device could be coupled to the microcomputer 28 for the same purpose. Also, instead of having to move the manual selector tab 18 out of the "OFF" setting for flash picture-taking, a known ambient light sensor coupled to the microcomputer 28 could be used to automatically accomplish the same.

When the multiple flash bulb unit 12 is disconnected from the camera 10 at the socket 14, known means can be provided for returning the manual selector tab 18 to its "OFF" setting. Similarly, after all of the flash bulbs 16 have been used, the means can return the manual selector tab 18 to its "OFF" setting and activate a warning indication for the photographer.

Parts List 10. camera
12. multiple flash bulb unit
14. flash socket
16. flash bulbs
18. manual selector tab
20. indicator lead
22. input lead
24. input lead
26. input lead
28. microcomputer
30. three-state selector switch
32. input/output leads
34. taking lens
36. shutter release button
38. indicator lead
40. input lead
42. two-stage shutter release switch
44. multi-zone automatic focus/rangefinder device.

I claim:

1. A camera intended to be used with a multiple flash bulb unit with different unused flash bulbs being arranged at different distances from said camera, comprising:

a taking lens; and means for selecting an unused flash bulb farthest from said taking lens to reduce a red-eye effect only when a camera-to-subject distance does not exceed a predetermined distance.

2. A camera as recited in claim 1, further comprising:

means for selecting an unused flash bulb closest to said taking lens only when the camera-to-subject distance is greater than the predetermined distance.

3. A camera intended to be used with a multiple flash bulb unit with different unused flash bulbs being arranged at different distances from said camera, comprising:

a taking lens;

means for selecting a relatively near range camera-to-subject distance, and for selecting a relatively far range camera-to-subject distance that is greater than the near range camera-to-subject distance; and means for selecting an unused flash bulb farthest from said taking lens to reduce a red-eye effect when the near range camera-to-subject distance is selected and for selecting an unused flash bulb closest to said taking lens when the far range camera-to-subject distance is selected.

4. A camera as recited in claim 3, wherein a shutter release switch changes state when picture-taking is initiated, and means ignites the selected unused flash bulb farthest or closest to said taking lens responsive to said shutter release switch changing state.

5. A camera intended to be used with a multiple flash bulb unit with different unused flash bulbs being arranged at different distances from said camera, comprising:

a taking lens; and means for sequentially selecting each remaining unused flash bulb farthest from said taking lens to reduce a red-eye effect when a camera-to-subject distance does not exceed a predetermined distance.

* * * * *